(12) United States Patent
Tian et al.

(10) Patent No.: US 12,652,263 B2
(45) Date of Patent: Jun. 9, 2026

(54) CHAT OPERATIONS NOTIFICATION MANAGEMENT

(71) Applicant: International Business Machines Corporation, Armonk, NY (US)

(72) Inventors: Xing Tian, Beijing (CN); Yong Hu Sun, Beijing (CN); Pei Ran Han, Beijing (CN); Xiao Juan Niu, Beijing (CN); Li Jian Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 18/587,256

(22) Filed: Feb. 26, 2024

(65) Prior Publication Data

US 2025/0274423 A1 Aug. 28, 2025

(51) Int. Cl.
| | |
|---|---|
| *G06F 15/16* | (2006.01) |
| *H04L 51/224* | (2022.01) |
| *H04L 51/226* | (2022.01) |

(52) U.S. Cl.
CPC .......... H04L 51/224 (2022.05); H04L 51/226 (2022.05)

(58) Field of Classification Search
CPC ................................. H04L 51/21; G06F 40/35
USPC .......................................................... 709/206
See application file for complete search history.

(56) References Cited

U.S. PATENT DOCUMENTS

| | | | | | |
|---|---|---|---|---|---|
| 6,845,155 | B2 * | 1/2005 | Elsey | .................. | H04M 3/5237 |
| | | | | | 379/266.04 |
| 6,970,548 | B2 * | 11/2005 | Pines | .................. | H04M 15/00 |
| | | | | | 455/414.3 |
| 6,978,136 | B2 * | 12/2005 | Jenniges | .................. | H04W 4/12 |
| | | | | | 455/433 |
| 7,023,969 | B2 * | 4/2006 | Pines | .................... | H04M 15/68 |
| | | | | | 379/88.16 |
| 7,027,570 | B2 * | 4/2006 | Pines | .................... | H04M 15/41 |
| | | | | | 379/88.16 |
| 7,076,046 | B2 * | 7/2006 | Pines | ...................... | H04W 4/16 |
| | | | | | 379/218.01 |
| 7,088,814 | B1 * | 8/2006 | Shaffer | ............... | H04M 3/5233 |
| | | | | | 379/265.11 |

(Continued)

FOREIGN PATENT DOCUMENTS

| | | |
|---|---|---|
| CN | 103546515 A | 1/2014 |
| CN | 106844673 A | 6/2017 |

(Continued)

*Primary Examiner* — Alicia Baturay

(74) *Attorney, Agent, or Firm* — Seed Intellectual Property Law Group LLP

(57) ABSTRACT

One or more computer processors training a model with historical incidents, wherein each historical incident is associated with group information and system event properties. The one or more computer processors responsive to a new incident, extract group information from one or more users and extracting system event property information from the new incident. The one or more computer processors calculate a notification priority score for each user utilizing the extracted system event property information and the extracted group information. The one or more computer processors generate a notification based on the new incident. The one or more computer processors transmit the generated notification to the one or more users at a determined interval based on the calculated respective notification priority score for each user and a notification strategy.

20 Claims, 5 Drawing Sheets

(56) References Cited

U.S. PATENT DOCUMENTS

| | | | | |
|---|---|---|---|---|
| 7,218,711 B2 * | 5/2007 | Pines | .............. | H04M 15/8044 |
| | | | | 379/218.01 |
| 7,269,567 B1 * | 9/2007 | Pletz | ................ | G06Q 30/0241 |
| | | | | 705/7.12 |
| 7,346,157 B2 * | 3/2008 | Pines | ................ | H04M 3/5237 |
| | | | | 379/218.01 |
| 7,373,304 B1 * | 5/2008 | Pletz | ................ | G06Q 30/0207 |
| | | | | 705/346 |
| 7,657,892 B2 * | 2/2010 | Langen | ............... | G06F 9/4881 |
| | | | | 718/104 |
| 7,672,441 B2 * | 3/2010 | Pines | ................ | H04M 3/5237 |
| | | | | 379/218.01 |
| 7,804,944 B2 * | 9/2010 | Pines | ................... | H04M 15/00 |
| | | | | 455/406 |
| 8,023,633 B2 * | 9/2011 | Pines | ................... | H04M 15/44 |
| | | | | 455/414.3 |
| 8,036,365 B2 * | 10/2011 | Pines | .............. | H04M 15/8038 |
| | | | | 455/414.3 |
| 8,085,923 B2 * | 12/2011 | Pines | .............. | H04M 15/8033 |
| | | | | 379/218.01 |
| 8,139,748 B2 * | 3/2012 | Pines | ................... | H04M 15/44 |
| | | | | 379/201.11 |
| 8,265,242 B2 * | 9/2012 | Pines | ................ | H04M 3/4933 |
| | | | | 455/406 |
| 8,265,609 B2 * | 9/2012 | Deliwala | ............ | H04M 3/4938 |
| | | | | 455/418 |
| 8,311,863 B1 * | 11/2012 | Kemp | ............... | G06Q 10/0639 |
| | | | | 705/7.29 |
| 8,358,767 B2 * | 1/2013 | Pines | ................ | H04M 3/4931 |
| | | | | 379/218.01 |
| 8,448,015 B2 * | 5/2013 | Gerhart | ................ | G06Q 10/06 |
| | | | | 714/25 |
| 8,825,762 B2 * | 9/2014 | Bi | ..................... | H04M 1/72403 |
| | | | | 709/204 |
| 8,868,660 B2 * | 10/2014 | Hastings | ............... | H04L 67/306 |
| | | | | 709/224 |
| 8,996,532 B2 * | 3/2015 | Bhatt | ...................... | G06F 16/31 |
| | | | | 707/741 |
| 9,047,631 B2 * | 6/2015 | Sridharan | .......... | G06Q 30/0613 |
| 9,244,964 B2 * | 1/2016 | Bhatt | .................. | G06F 16/2228 |
| 9,407,652 B1 * | 8/2016 | Kesin | ................... | H04L 67/535 |
| 9,451,576 B2 * | 9/2016 | Lifshitz | ................ | H04W 64/00 |
| 9,532,387 B2 * | 12/2016 | Marshall | .............. | H04W 4/025 |
| 9,549,419 B2 * | 1/2017 | Marshall | .............. | H04W 76/50 |
| 9,628,500 B1 * | 4/2017 | Kesin | ................. | H04L 61/5007 |
| 9,794,390 B2 * | 10/2017 | Bi | ...................... | H04M 1/72403 |
| 10,075,464 B2 * | 9/2018 | Kesin | ....................... | G06N 7/01 |
| 10,360,309 B2 * | 7/2019 | Chisholm | .......... | H04M 3/5141 |
| 10,395,648 B1 * | 8/2019 | Benkreira | .............. | G06F 40/30 |
| 10,614,661 B2 * | 4/2020 | Simons | .................. | G06F 21/32 |
| 10,728,376 B2 * | 7/2020 | Bi | ......................... | G06F 3/0482 |
| 10,733,614 B2 * | 8/2020 | Sapoznik | ............ | G06Q 30/016 |
| 10,735,448 B2 * | 8/2020 | Kesin | ....................... | G06N 7/01 |
| 10,783,878 B2 * | 9/2020 | Benkreira | ........... | G06Q 30/015 |
| 10,839,335 B2 * | 11/2020 | Weisman | ............... | G06N 20/00 |
| 11,005,995 B2 * | 5/2021 | Weisman | ............... | G06N 3/045 |
| 11,106,875 B2 * | 8/2021 | Ho | .................... | G06F 16/90332 |
| 11,153,260 B2 * | 10/2021 | Keller | ..................... | H04L 51/56 |
| 11,244,017 B2 | 2/2022 | Sayyadi | | |
| 11,310,254 B2 * | 4/2022 | Kesin | ................. | H04L 63/1416 |
| 11,487,537 B2 | 11/2022 | Nidd | | |
| 11,513,872 B2 | 11/2022 | Srinivasan | | |
| 11,704,496 B2 * | 7/2023 | Benkreira | ................ | G06N 3/09 |
| | | | | 704/9 |
| 11,743,228 B2 * | 8/2023 | Keller | ..................... | H04L 51/56 |
| | | | | 709/206 |
| 12,063,198 B2 * | 8/2024 | Keller | .................... | H04L 51/56 |
| 12,335,224 B2 * | 6/2025 | Keller | .................... | H04L 51/56 |

FOREIGN PATENT DOCUMENTS

| | | | |
|---|---|---|---|
| CN | 114816943 A | 7/2022 | |
| CN | 115757116 A | 3/2023 | |

* cited by examiner

100

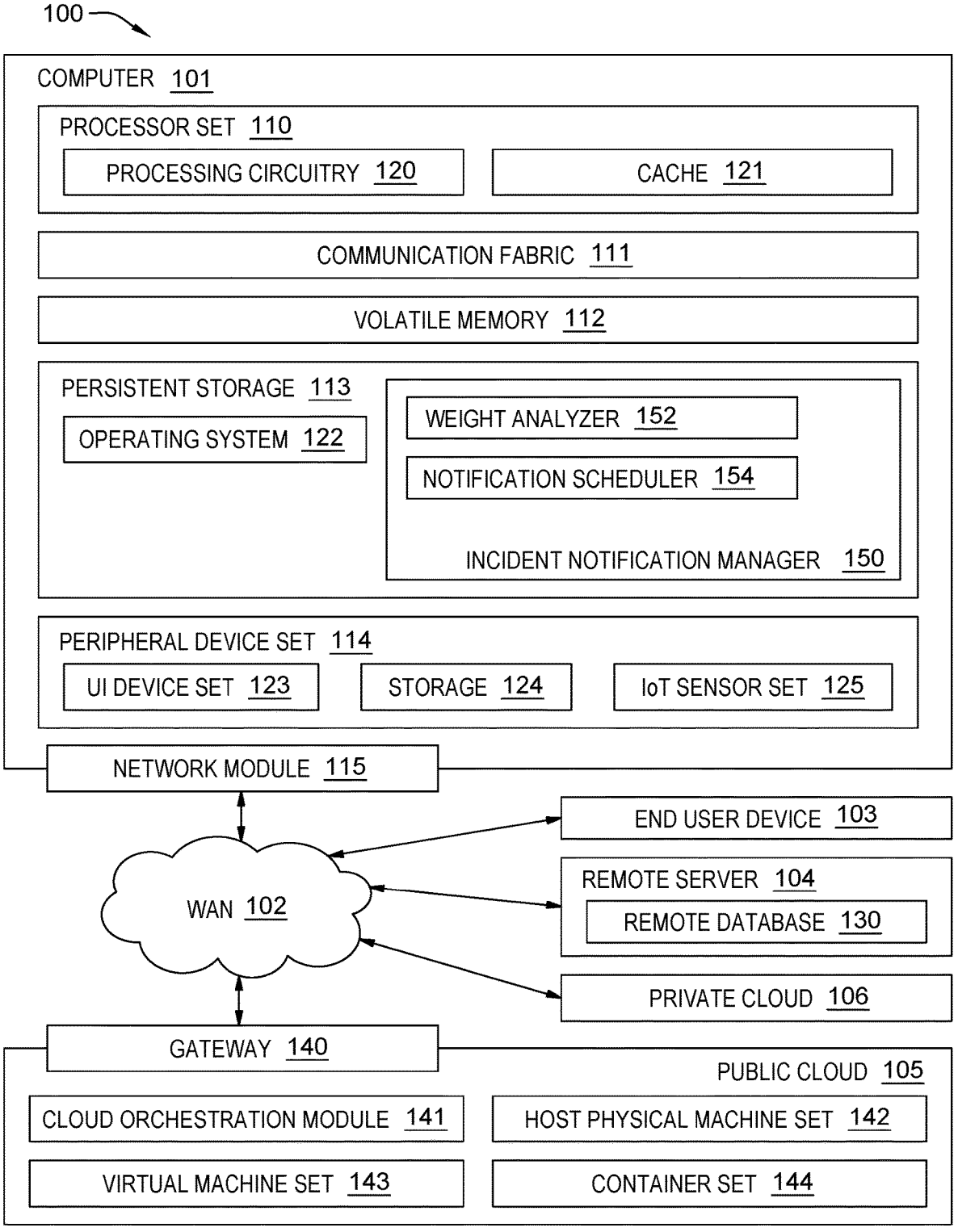

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

WEIGHT ANALYZER 152

NOTIFICATION SCHEDULER 154

INCIDENT NOTIFICATION MANAGER 150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

| M0 | M1 | M2 | M3 | M4 | M5 | M6 | M7 | M8 | M9 | M10 |
|---|---|---|---|---|---|---|---|---|---|---|
| | | | | | SRE MEMBERS INFO (M) | | | | | |
| NAME | TIMEZONE | REGION | WORKING HOUR | STATUS | COMPONENTS | SKILLS SET | CASES ON HOLD | SIMILAR CASES HANDLED | OVERALL CASES HANDLED | AVERAGE WORKLOAD |
| SRE_1 | 8 | APAC | 9:00 - 18:00 | ONLINE | C1,C2,C3 | S1,S2,S3,S4,S5 | 3 | 5 | 60 | 5 |
| SRE_2 | 6 | APAC | 9:00 - 18:00 | ONLINE | C4,C5,C6 | S1,S4,S7,S9 | 4 | 1 | 78 | 5 |
| SRE_3 | 3 | EMEA | 9:00 - 18:00 | ONLINE | C1,C3,C6 | S1,S2,S4,S8,S9 | 2 | 13 | 123 | 5 |
| SRE_4 | 1 | EMEA | 9:00 - 18:00 | ONLINE | C2,C4,C5 | S3,S6,S7,S9 | 1 | 1 | 8 | 5 |
| SRE_5 | -3 | LAD | 9:00 - 18:00 | OFFLINE | C1,C3,C4 | S1,S3,S4,S8 | 3 | 8 | 45 | 5 |
| SRE_6 | -5 | NA | 9:00 - 18:00 | OFFLINE | C2,C5,C6 | S1,S4,S7,S9 | 6 | 2 | 86 | 5 |

204

| EVENT INFORMATION (C) | |
|---|---|
| EVENT PROPERTY | VALUE |
| C1 SEVERITY | 1 |
| C2 PRIORITY | 2 |
| C3 LAST UPDATED | 2022/4/3/ 12:00 |
| C4 STATUS | OPEN |
| C5 CREATED TIME | 2022/4/2 12:00 |
| C6 COMPONENT | C1 |
| C7 REGION | APAC |
| C8 SKILL TAGS | S1,S3 |

SRE FACTOR

S1: ONDUTY_HOURS_TIME(Timezone+workinghour)

$$F(0): \ S1 = F(C3, M3) = \begin{cases} 10, \ (C3 - M3) \geq 6 \\ 6, \ 6 > (C3 - M3) \geq 3 \\ 3, \ 3 > (C3 - M3) \geq -1 \\ 0, (C3 - M3) \leq -2 \end{cases}$$

304

SRE FACTOR

S2: COMPONENTS_MATCHED:

$$F(1): \ S2 = F(C6, M5) = (C6, fM5) = \begin{cases} 1, \ C6 \in M5 \\ 0, \ C6 \notin M5 \end{cases}$$

306

SRE FACTOR

S3: SKILL_SETS:

$$F(2): \ S3 = F(C8, M6) = \frac{\sum_{i=0}^{n} f\{C8[i]), M6]}{Length(C8)}$$

$$f\{C8[i], m6\} = \begin{cases} 1, \ C8[i] \in M6 \\ 0, \ C8[i] \notin M6 \end{cases}$$

308

SRE FACTOR

S4: REGION:

$$F(3): \ S4 = F(C7, M2) = \begin{cases} 1, \ C7 = M2 \\ 0, \ C7 \neq M2 \end{cases}$$

310

SRE FACTOR

S5: F(4): S5=F(M10,M7)=A-M7, A IS AVERAGE CASE ON HOLD NUMBER, WHICH IS CONSTANT.

312

SRE FACTOR

S6:SIMILAR_TICKETS_HANDLED (>10: 2, >1 1, 0: 0)

$$F(5): \ S6 = F(M8) = \begin{cases} 2, \ M8 \geq 10 \\ 1, \ 10 > M8 \geq 1 \\ 0, \ M8 = 0 \end{cases}$$

314

SRE FACTOR

S7: OVERALL_TICKETS_HANDLED (>100:2, >10:1 , < 10 0:)

$$F(6): \ S76 = F(M9) = \begin{cases} 2, \ M9 \geq 100 \\ 1, \ 100 > M9 \geq 1 \\ 0, \ M9 = 10 \end{cases}$$

FIG. 3

CHAT OPERATIONS NOTIFICATION MANAGEMENT

BACKGROUND

The present invention relates generally to the field of communication, and more particularly to conversation-driven incident notification management.

Chat Operations (ChatOps) is the use of chat clients and real-time chat tools to facilitate software development and operations, also known as conversation-driven collaboration or conversation-driven Development Operations (DevOps). ChatOps is designed for fast and simple instant messaging between development team members (e.g., site reliability engineers). Throughout the ChatOps experience, a chatbot accepts plain-English commands and initiates actions with background apps (via API) to optimize IT operations (ITOps) and development operations (DevOps). ChatOps centralizes all communication about incidents, incident reports, plans, and progress as well as providing a place for DevOps, IT, communications, security, legal, and other relevant teams to collaborate on not only incident resolution and remediation, but also future incident prevention and risk mitigation.

SUMMARY

Embodiments of the present invention disclose a computer-implemented method, a computer program product, and a system. The computer-implemented method includes one or more computer processers training a model with historical incidents, wherein each historical incident is associated with group information and system event properties. The one or more computer processors responsive to a new incident, extract group information from one or more users and extracting system event property information from the new incident. The one or more computer processors calculate a notification priority score for each user utilizing the extracted system event property information and the extracted group information. The one or more computer processors generate a notification based on the new incident. The one or more computer processors transmit the generated notification to the one or more users at a determined interval based on the calculated respective notification priority score for each user and a notification strategy.

BRIEF DESCRIPTION OF THE DRAWINGS

FIG. (i.e., FIG. 1) is a functional block diagram illustrating a computing environment, in accordance with an embodiment of the present invention;

FIG. 2 illustrates a plurality of tables within the computing environment of FIG. 1, in accordance with an embodiment of the present invention;

FIG. 3 illustrates weighted factors within the computing environment of FIG. 1, in accordance with an embodiment of the present invention;

DETAILED DESCRIPTION

Figure 4:
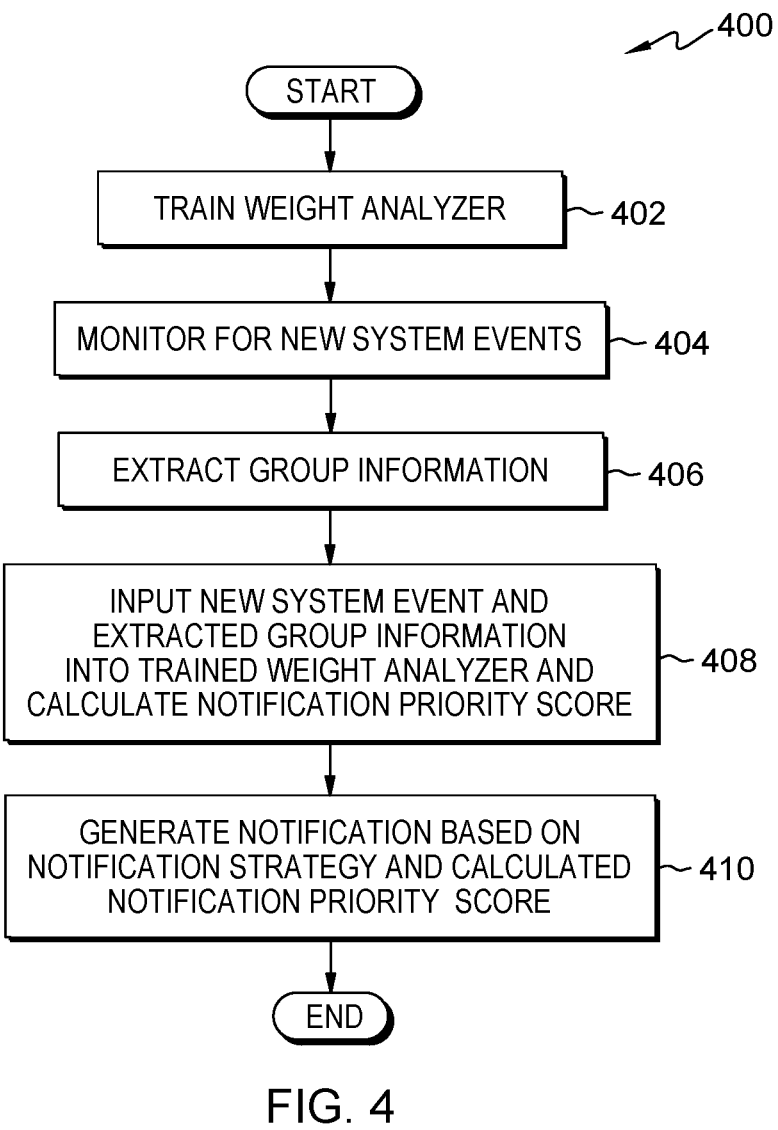
FIG. 4 is a flowchart depicting operational steps of a program, on a computer within the computing environment of FIG. 1, for conversation-driven incident notification management, in accordance with an embodiment of the present invention.

ChatOps is widely used to improve the effectiveness of team communication and cooperation. Many modern companies and organizations integrate systems and applications within chat applications to deliver event details, alarms, log notifications, and operation instructions to users (e.g., engineers). A typical characteristic of ChatOps is handling incidents and requests through conversation utilizing real-time interactive methods to allow continuous collaboration through dialogue. Often ChatOps notifications are delivered to a superset of users at the same time, forcing users to dedicate time and computational resources to comprehend and determine whether the notification is relevant. Organizations without effective ChatOps notification management are subject to computational inefficiencies, procedural inefficiencies, miscommunication, and elevated user inattention to subsequent notifications.

Embodiments of the present invention improve communications, computational efficiencies, and timeliness of ChatOps systems by generating and managing ChatOps notifications responsive to system events. Embodiments of the present invention improve computational efficiencies by reducing a number of notifications generated and delivered to a subset of users. Some embodiments of the present invention recognize that user communication is improved by reducing notification scope. Embodiments of the present invention improve ChatOps applications by determining which users receive notifications and determining at what interval to deliver said notifications. In these embodiments, the present invention selects one or more prioritized users based on respective multidimensional information (time zone, region, skills, time of last task processing, etc.) utilizing a model trained with a batch gradient descent (BGD) algorithm on historical incidents and extracted group information. Embodiments of the present invention improve notification generation, deliverance, and management, when a notification receiver (i.e., user or subset of users) is not predetermined, by notifying some users first and delaying other users. Implementation of embodiments of the invention may take a variety of forms, and exemplary implementation details are discussed subsequently with reference to the Figures.

The present invention will now be described in detail with reference to the Figures.

FIG. 1 depicts computing environment 100 illustrating components of computer 101 in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation, or garbage collection, but this does not render the storage device as transitory because the data is not transitory while it is stored.

Computing environment 100 contains an example of an environment for the execution of at least some of the computer code involved in performing the inventive methods, such as incident notification manager 150, hereinafter referred to as program 150. In addition to program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip". In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in program 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Program 150 is a program, a subprogram of a larger program, an application, a plurality of applications, or mobile application software, which functions to manage conversation-driven incident notifications. In various embodiments, program 150 may implement the following steps: train a model with historical incidents, wherein each historical incident is associated with group information and system event properties; responsive to a new incident, extract group information from one or more users and extracting system event property information from the new incident; calculate a notification priority score for each user utilizing the extracted system event property information and the extracted group information; generate a notification based on the new incident; transmit the generated notification to the one or more users at a determined interval based on the calculated respective notification priority score for each user and a notification strategy; and responsive to a remediation outcome, retrain the model based on the generated notification and the remediation outcome.

In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over WAN 102. In various embodiments, client versions of program 150 resides on any other computing device (not depicted) within computing environment 100. In the depicted embodiment, program 150 includes weight analyzer 152 and notification scheduler 154. In an embodiment, program 150 contains a timing subprogram that adjusts a duration between notifying a plurality of group members. In an embodiment, program 150 contains a feedback subprogram that adjusts and retrains weight analyzer 152 based on program 150 responses to system events and respective results. Program 150 is depicted and described in further detail with respect to FIG. 4.

Weight analyzer 152 is representative of a model utilizing deep learning techniques to train, calculate weights, ingest inputs (e.g., group information and system event properties), and output a notification priority score (e.g., site reliability engineer (SRE) score). In an embodiment, weight analyzer 152 is comprised of any combination of deep learning model, technique, and algorithm (e.g., decision trees, Naive Bayes classification, support vector machines for classification problems, random forest for classification and regression, linear regression, least squares regression, logistic regression). In an embodiment, weight analyzer 152 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In the depicted embodiment, weight analyzer 152 is a model trained utilizing supervised training methods (i.e., batch gradient descent algorithm).

In an embodiment, weight analyzer 152 contains a state evaluator subprogram that utilizes online analysis and processing based on knowledge graphs or data cubes created from system events and group information, as further described in FIGS. 2, 3 and 4. In an embodiment, responsive to a single variable measurement, state evaluator subprogram builds a regression model with deep learning (e.g., RNN, LSTM). In another embodiment, responsive to multi-variant measurements, state evaluator subprogram clusters (e.g., k-means, hierarchical clustering) the measurements into a plurality of related clusters, wherein each forms a steady state. In another embodiment, responsive to a set of sequences (e.g., event sequences, group (e.g., SRE) sequences), state evaluator subprogram extracts one or more frequent (e.g., above a frequency threshold) sequences from the set given a support setting and state evaluator subprogram calculates significant variables. In an embodiment, weight analyzer 152 contains an event analysis and mapping subprogram that determines respective event property priority weights. In an embodiment, weight analyzer 152 contains a weight calculator subprogram that calculates a weight for a multi-dimensional element (e.g., group information and system event properties) as further detailed in FIG. 4. The training of weight analyzer 152 is depicted and described in further detail with respect to FIG. 4.

Notification scheduler 154 is a submodule that generates a SRE notification batch list based on a notification strategy and one or more prioritized users and transmits or delivers the generated notification controlled by the notification batch list and notification strategy. In an embodiment, notification scheduler 154 ingests a notification strategy and one or more calculated notification priority scores and outputs one or more generated notifications, a priority list of batched users, and associated timing strategy, where the notification strategy controls notification delivery method, required permissions (e.g., permissions to access systems associated with an incident, permissions to access physical location (e.g., warehouse, room) associated with an incident) and timing strategy controls a timing interval between notifying batched users. Notification scheduler 154 is further detailed in the discussion of FIG. 4.

The present invention may contain various accessible data sources that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

FIG. 2 depicts tables 200, in accordance with an illustrative embodiment of the present invention. Tables 200 includes table 202 and table 204. Table 202 is a table containing group information (M) associated with a plurality of SRE members (e.g., SRE_1). Each SRE member in the plurality of SRE members has the following elements, parameters, or factors: time zone, region, working hours, status, components, skill sets, cases on hold, similar cases handled, overall cases handled, and average workload. Table 204 is a table containing system event properties (C) associated with an incident. Table 204 includes the following properties: severity, priority, last updated, status, created time, component, region, and skills tags.

FIG. 3 depicts SRE factors 300 which demonstrates a plurality of weighted group information and system event properties that are utilized to calculate a notification priority score for a specified user. SRE factors 300 contains SRE Factor 302, SRE Factor 304, SRE Factor 306, SRE Factor 308, SRE Factor 310, SRE Factor 312, and SRE Factor 314. SRE Factor 302 is an example of a weighted combination of user working hours with the last update of the system event (i.e., incident). SRE Factor 304 is an example of a weighted combination of components available to a user and required incident components. SRE Factor 306 is an example of a weighted combination of user skills sets and required incident skill sets. SRE Factor 308 is an example of a weighted combination of user region and incident region. SRE Factor 310 is an example of a weighted combination of user cases on hold and user cases on hold. SRE Factor 312 is an example of a weighted combination of user similar tickets handled. SRE Factor 314 is an example of a weighted user overall cases handled.

FIG. 4 depicts flowchart 400 illustrating operational steps of program 150 for conversation-driven incident notification management, in accordance with an embodiment of the present invention.

Program 150 trains a weight analyzer (step 402). In another embodiment, program 150 initiates responsive to a newly identified incident. In an embodiment, an incident is created responsive to one or more system event properties or parameters (e.g., increased error rate, increased computational demand, stalled applications) deviating from one or more historical baselines, trends, meeting or exceeding one or more predetermined thresholds. In an embodiment, program 150 initiates responsive to a user (e.g., SRE) request for a training or retraining of weight analyzer 152 with historical incidents, cases, or tickets. In such an embodiment, each historical incident, case, or ticket includes, but is not limited to, historical group information, system event properties, and respective element weights. In an embodiment, group information includes group information elements/parameters (e.g., skill sets, regions) and a respective weight for each user associated with a historical incident. In such an embodiment, group information includes, but is not limited to, user time zone, region, on duty time, working hours, current status, available components, skill sets (e.g., proficiencies, certifications, achievements, educational degrees, historical performance), number of cases on hold, average workload, number of similar cases (i.e., incident remediation), and number of overall cases. In an embodiment, system event properties include, but are not limited to, incident severity, incident priority, incident status, incident last updated timestamp, incident region, incident required skills, incident required components, and incident creation timestamp.

In an embodiment, program 150 utilizes one or more machine learning algorithms (e.g., batch gradient descent (BGD)) to determine (e.g., weight calculator subprogram) an optimal weight for each training example (e.g., historical incidents with respective SRE weight), and program 150 iteratively updates weight analyzer 152 with respect to all training examples in a training dataset (i.e., historical incidents and associated group information). In such an embodiment, program 150 utilizes the following expression f ($W_1$, $W_2$, . . . , $W_n$) to represent each SRE element weight, where $w_1$, $W_2$, . . . , $W_n$ are one or more input variables (i.e., group information and system event properties) and f is an output variable (e.g., SRE notification priority list). In an embodiment, for each $w_n$, program 150 updates and calculates a respective weight utilizing a calculated gradient representing a partial derivative of a function on each input variable. In a further embodiment, program 150 utilizes BGD and the following gradient function, $$W_j^t - n \times \text{gradient}_j,$$

to calculate a respective weight for each input variable. In an embodiment, program 150 utilizes the following loss function to the respective gradient: gradient $j = \partial \text{LossW}_j$. In an embodiment, program 150 repeats step 402 until program 150 meets or exceeds a specified number of iterations or a convergence criterion, for example, calculating a weight sufficiently comparable to a historical weight associated with a previously completed SRE response (i.e., historical incident). For example, program 150 iteratively computes a gradient, updates one or more parameters of weight analyzer 152 utilizing a gradient descent update algorithm, computes one or more weights utilizing the gradient and parameters, and returns optimal weights, resulting in a trained or retrained weight analyzer 152.

Program 150 monitors for new system events (step 404). In an embodiment, responsive to a trained weight analyzer 152, program 150 collects and aggregates volumes of both structured and unstructured data (i.e., system events) generated by one or more infrastructure components such as information technology applications, performance-monitoring tools, and service ticketing systems. For example, program 150 monitors and collects information regarding container performance. In another embodiment, program 150 monitors one or more environmental parameters associated with a monitored location. For example, program 150 monitors and collects environmental parameters regarding one or more physical conditions (e.g., robot temperature, weather conditions associated with a physical location) associated with an autonomous robot operating in a monitored warehouse. Responsive to an identified system event, program 150 extracts one or more system event properties as described in step 402.

Program 150 extracts group information (step 406). In an embodiment, responsive to the new system event, program 150 extracts current group information as described in step 402. In an embodiment, program 150 queries a database containing all available users (e.g., SREs). In another embodiment, program 150 retrieves all available SREs from a collaboration application. In an embodiment, responsive to a set of retrieved available SREs, program 150 extracts respective group information for each retrieved SRE.

Program 150 inputs the new system event and extracted group information into the trained weight analyzer and calculates a notification priority score (step 408). In an embodiment, program 150 inputs extracted system event properties and extracted group information into trained weight analyzer 152, responsively, weight analyzer 152 calculates a respective notification priority score (e.g., SRE score) for each user. In such an embodiment, the calculated SRE score is a priority score or ranking, where a higher ranking, weight, or priority represents that a corresponding SRE or groups of SREs will be notified before lower priority SREs. FIG. 2 further demonstrates a plurality of group information factors (e.g., SRE factors) and system event properties. FIG. 3 demonstrates program 150 utilizing weighted group information and weighted system event properties to calculate a final SRE score. For example, program 150 utilizes one or more weights calculated by weight analyzer 152 and the following equation to calculate the SRE score: $P(i)=M(i,j)*C(j)$, where M is a group information parameter and C is a system event property as shown in tables 302 and 304 within FIG. 3. In an embodiment, program 150 repeats step 408 for each user (e.g., SRE), assigning each user a notification priority score.

Program 150 generates a notification based on a notification strategy and the calculated SRE score (step 410). Responsive to one or more users with a respective assigned notification priority score, program 150 utilizes notification schedule 154 to create a dynamic user (e.g., SRE) batch list containing one or more groups of users, each with differing notification delivery timing based on a dynamic notification strategy. For example, program 150 groups a set of users into 6 batches, where batch receives a notification a different time interval responsive to a failure or non-response in a preceding batch. In a further example, batch_1 receives a notification immediately and according to the notification strategy, the users within batch_1 have 10 minutes to respond before program 150 notifies a subsequent (e.g., lower priority) batch, batch_2 has 30 minutes, batch_3 60 minutes, batch_4 180 minutes, batch_5 12 hours, and batch_6 24 hours.

In an embodiment, program 150 transmits a generated notification to each user in a highest prioritized batch, where program 150 generates the notification to contain details (e.g., required components, required permissions, safety considerations, estimated remediation duration) required for the remediation of the incident. In such an embodiment, program 150 suspends notification scheduler 154 until a duration of time has lapsed as specified in the notification strategy. Responsive to at least one user in a notified batch responding to program 150 as active, program 150 suspends all notifications associated with the incident. Responsive to no user in a batch responding as active and/or every user in a notified batch responding as inactive, program 150 transmits the notification to a subsequent batch (e.g., lower priority batch). In an embodiment, program 150 continues to notify lower priority users until the incident has been resolved or all users have been notified.

In an embodiment, if program 150 has sent a notification to each user and no user responds and/or is successful with remediation, program 150 resets the created priority batch list and resumes at step 406. In another embodiment, if program 150 has sent a notification to each user and no user responds and/or is successful with remediation, program 150 identifies a most similar historical incident with an associated successful remediation. In such an embodiment, program 150 transmits instructions to an application or automated robot to perform a remediation utilizing the identified most similar historical incident as a baseline procedure.

Responsive to a remediation outcome (e.g., successful, failed, partially successful, successful but solution exceeded expected remediation duration), program 150 utilizes contained feedback subprogram to adjust and retrain weight analyzer 152 based on feedback provided by one or more group members involved in the remediation outcome. In a further embodiment, program 150 requests feedback from the user, where feedback includes whether the remediation was successful, whether an assigned time interval was appropriate, whether required permissions were sufficient, etc. For example, responsive to a remediation outcome, program 150 utilizes the feedback subprogram to retrain the model and/or adjust one or more weights based on the generated notification and the remediation outcome, and a user feedback loop. In such an embodiment, program 150 retrains weight analyzer 152 and adjusts an associated notification strategy based on the elicited user feedback. In an embodiment, program 150 dynamically adjusts the notification strategy based on a remediation outcome (e.g., resolved, failed, non-response due to lack of skill sets, non-response due to) of the incident. In an embodiment, responsive to a new user, program 150 repeats steps 406-410 with an addition of group information associated with the new user and previous remediation attempts (e.g., program 150 will not contact a previous notified user that failed remediation).

Figure 5:
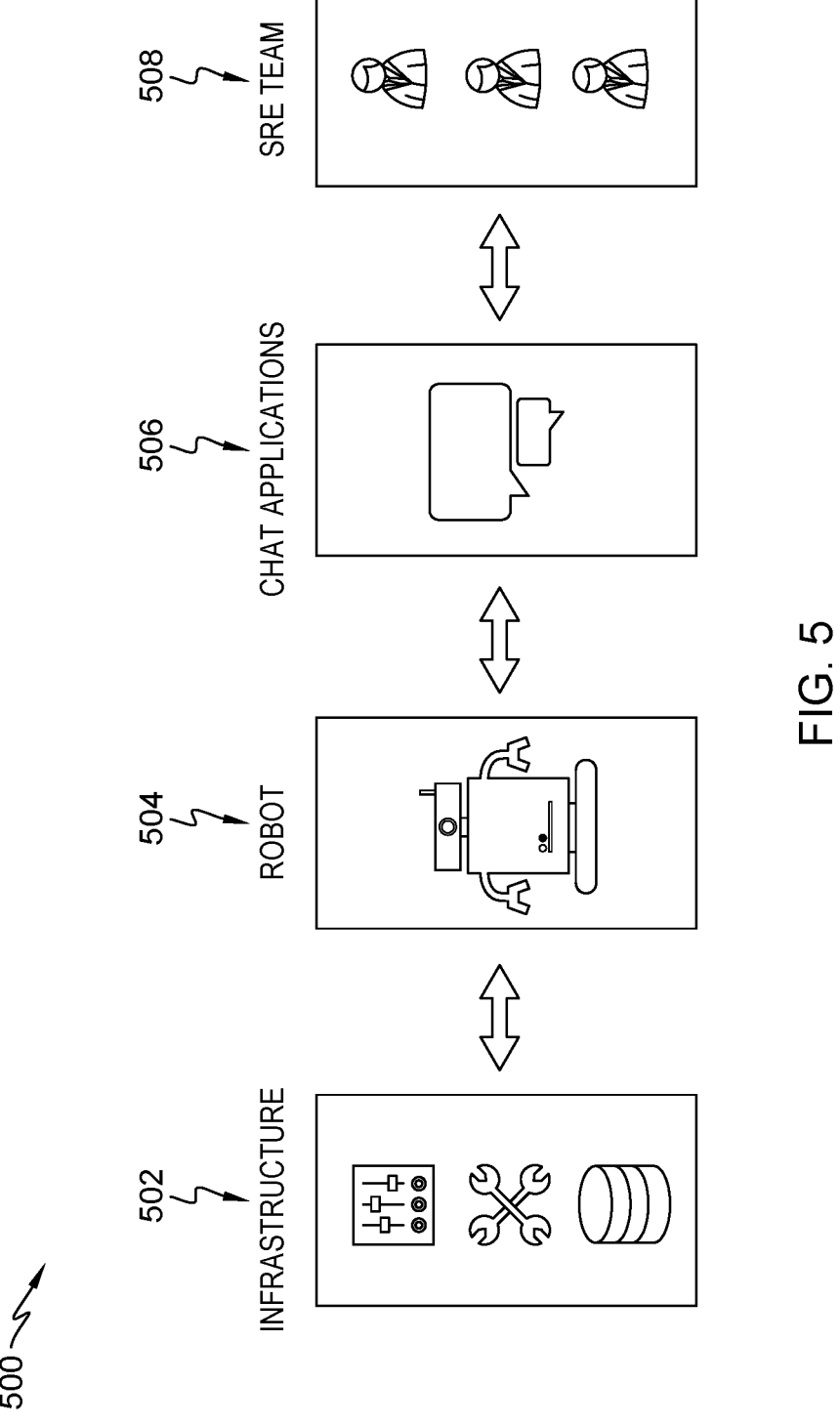
FIG. 5 illustrates an example of the operational steps of the program within the computing environment of FIG. 1, in accordance with an embodiment of the present invention.

FIG. 5 illustrates example 500 in accordance with an illustrative embodiment of the present invention. Example 500 contains infrastructure 502 (e.g., data warehouse), robot 504 (e.g., automated drone), chat application 506 (e.g., collaborative chat application), and SRE team 508 (e.g., a plurality of users dedicated to incident remediation within infrastructure 502). Program 150 monitors infrastructure 502 for deviations, disruptions, failures, or errors. Responsive to a new incident, program 150 utilizes trained weight analyzer 152 to ingest one or more system event properties extracted from data associated from the incident. After ingestion, program 150 extracts group information from each user within SRE team 508. The extracted group information and the one or more system event properties are inputted into trained weight analyzer 152 and each user is assigned a calculated notification priority score, where the higher the score, the higher the notification priority. Responsively, program 150 batches the users based on respective score and inputs the batched users into notification scheduler 154. Notification scheduler 154 generates a notification detailing the incident and transmits the notification to the highest priority batch of users. The notified users provide program 150 with remediation details in which program 150 translates to program instructions and program 150 provides said instructions to robot 504. Robot 504 then remediates the incident within infrastructure 502 according to the provided instructions.

What is claimed is:

1. A computer-implemented method comprising:

training a model with historical incidents, wherein each historical incident is associated with group information and system event properties;

responsive to a new incident, extracting group information from one or more users and extracting system event property information from the new incident, wherein the extracted system event property information includes permissions required to access a system associated with the new incident, and wherein the extracted group information includes respective user historical performance;

calculating a notification priority score for each user utilizing the extracted system event property information and the extracted group information;

generating a notification based on the new incident;

transmitting the generated notification to the one or more users at a determined interval based on the calculated respective notification priority score for each user and a notification strategy; and responsive to no user responding to the transmitted notification, identifying another incident most similar to the new incident, based on respective system event properties, and transmitting instructions to an automated application to perform a remediation based on a successful remediation associated with the most similar incident.

2. The computer-implemented method of claim 1, further comprising:

creating a dynamic user batch list containing one or more batches of users, wherein each batch of users is associated with a different notification delivery timing based on the notification strategy.

3. The computer-implemented method of claim 2, further comprising:

responsive to one or more users in a first batch responding as inactive, transmitting the generated notification to one or more users in a second batch, wherein the one or more users in the second batch have a lower notification priority than the one or more users in the first batch.

4. The computer-implemented method of claim 1, further comprising:

suspending one or more notifications until a duration of time has lapsed as specified in the notification strategy.

5. The computer-implemented method of claim 1, wherein the extracted group information is selected from the group consisting of a time zone, region, an on duty time, working hours, a current status, available components, skill sets, a number of cases on hold, an average workload, a number of similar cases, and a number of overall cases.

6. The computer-implemented method of claim 1, wherein the notification includes data selected from the group consisting of incident severity, incident priority, incident status, incident last updated timestamp, incident region, incident required skills, incident required components, and incident creation timestamp.

7. The computer-implemented method of claim 1, wherein the group information is extracted from one or more site reliability engineers (SREs).

8. A computer program product comprising:

one or more computer readable storage media having computer-readable program instructions stored on the one or more computer readable storage media, said program instructions executes a computer-implemented method comprising steps of:

training a model with historical incidents, wherein each historical incident is associated with group information and system event properties;

responsive to a new incident, extracting group information from one or more users and extracting system event property information from the new incident, wherein the extracted system event property information includes permissions required to access a system associated with the new incident, and wherein the extracted group information includes respective user historical performance;

calculating a notification priority score for each user utilizing the extracted system event property information and the extracted group information;

generating a notification based on the new incident;

transmitting the generated notification to the one or more users at a determined interval based on the calculated respective notification priority score for each user and a notification strategy; and responsive to no user responding to the transmitted notification, identifying another incident most similar to the new incident, based on respective system event properties, and transmitting instructions to an automated application to perform a remediation based on a successful remediation associated with the most similar incident.

9. The computer program product of claim 8, wherein the program instructions, stored on the one or more computer readable storage media, further comprise the steps of:

creating a dynamic user batch list containing one or more batches of users, wherein each batch of users is associated with a different notification delivery timing based on the notification strategy.

10. The computer program product of claim 9, wherein the program instructions, stored on the one or more computer readable storage media, further comprise the steps of:

responsive to one or more users in a first batch responding as inactive, transmitting the generated notification to one or more users in a second batch, wherein the one or more users in the second batch have a lower notification priority than the one or more users in the first batch.

11. The computer program product of claim 8, wherein the program instructions, stored on the one or more computer readable storage media, further comprise the steps of:

suspending one or more notifications until a duration of time has lapsed as specified in the notification strategy.

12. The computer program product of claim 8, wherein the extracted group information is selected from the group consisting of a time zone, region, an on duty time, working hours, a current status, available components, skill sets, a number of cases on hold, an average workload, a number of similar cases, and a number of overall cases.

13. The computer program product of claim 8, wherein the notification includes data selected from the group consisting of incident severity, incident priority, incident status, incident last updated timestamp, incident region, incident required skills, incident required components, and incident creation timestamp.

14. The computer program product of claim 8, wherein the group information is extracted from one or more site reliability engineers (SREs).

15. A computer system comprising:

one or more computer processors; and one or more computer readable storage media having computer readable program instructions stored on the one or more computer readable storage media for execution by at least one of the one or more processors, the stored program instructions execute a computer-implemented method comprising steps of:

training a model with historical incidents, wherein each historical incident is associated with group information and system event properties;

responsive to a new incident, extracting group information from one or more users and extracting system event property information from the new incident, wherein the extracted system event property information includes permissions required to access a system associated with the new incident, and wherein the extracted group information includes respective user historical performance;

calculating a notification priority score for each user utilizing the extracted system event property information and the extracted group information;

generating a notification based on the new incident;

transmitting the generated notification to the one or more users at a determined interval based on the calculated respective notification priority score for each user and a notification strategy; and responsive to no user responding to the transmitted notification, identifying another incident most similar, based on respective system event properties, to the new incident and transmitting instructions to an automated application to perform a remediation based on a successful remediation associated with the most similar incident.

16. The computer system of claim 15, wherein the program instructions stored on the one or more computer readable storage media, further comprise the steps of:

creating a dynamic user batch list containing one or more batches of users, wherein each batch of users is associated with a different notification delivery timing based on the notification strategy.

17. The computer system of claim 16, wherein the program instructions stored on the one or more computer readable storage media, further comprise the steps of:

responsive to one or more users in a first batch responding as inactive, transmitting the generated notification to one or more users in a second batch, wherein the one or more users in the second batch have a lower notification priority than the one or more users in the first batch.

18. The computer system of claim 15, wherein the extracted group information is selected from the group consisting of a time zone, region, an on duty time, working hours, a current status, available components, skill sets, a number of cases on hold, an average workload, a number of similar cases, and a number of overall cases.

19. The computer system of claim 15, wherein the notification includes data selected from the group consisting of incident severity, incident priority, incident status, incident last updated timestamp, incident region, incident required skills, incident required components, and incident creation timestamp.

20. The computer system of claim 15, wherein the notification includes data selected from the group consisting of required components, required permissions, safety considerations, and estimated remediation duration.

* * * * *